United States Patent [19]

Igarashi et al.

[11] Patent Number: 4,870,995
[45] Date of Patent: Oct. 3, 1989

[54] HOSE

[75] Inventors: Shigeru Igarashi; Osamu Ozawa, both of Hiratsuka, Japan

[73] Assignee: The Yokohama Rubber Co., Ltd., Tokyo, Japan

[21] Appl. No.: 256,178

[22] Filed: Oct. 11, 1988

Related U.S. Application Data

[63] Continuation of Ser. No. 137,615, Dec. 24, 1987, abandoned.

[30] Foreign Application Priority Data

Dec. 27, 1986 [JP] Japan ............................... 61-309891
Dec. 27, 1986 [JP] Japan ............................... 61-309892

[51] Int. Cl.$^4$ ............................................ F16L 09/14
[52] U.S. Cl. ................................. 138/126; 138/124; 138/125; 138/137; 138/DIG. 7
[58] Field of Search ............... 138/123, 124, 125, 126, 138/137, 140, 177, 178, 130, DIG. 7

[56] References Cited

U.S. PATENT DOCUMENTS

| | | | |
|---|---|---|---|
| 3,599,677 | 8/1971 | O'Brien | 138/126 |
| 4,035,534 | 7/1977 | Nyberg | 138/137 |
| 4,089,360 | 5/1978 | Böhm | 138/137 |
| 4,287,217 | 9/1981 | Hammer et al. | 138/137 |
| 4,322,260 | 3/1982 | Conlon | 138/126 |
| 4,457,799 | 7/1984 | Dunn | 138/137 |
| 4,559,095 | 12/1985 | Rabbin | 138/126 |
| 4,603,712 | 8/1986 | Krause | 138/137 |
| 4,633,912 | 1/1987 | Pilkington et al. | 138/137 |
| 4,657,285 | 4/1987 | Akiyama et al. | 138/137 |
| 4,688,605 | 8/1987 | Eisenzimmer et al. | 138/130 |

*Primary Examiner*—James E. Bryant, III
*Attorney, Agent, or Firm*—Finnegan, Henderson, Farabow, Garrett, Dunner

[57] ABSTRACT

High performance hose is disclosed which is characterized by enhanced heat resistance, leading to prolonged service life, and hence are suitable for use in automobile power steering units. The inner tube has a double-layered construction composed of an inner layer of hydrogenated acrylonitrile/butadiene copolymer rubber and an outer layer of rubber composition which comprises specified amounts of a selected class of sulfurs, organic peroxide and triazine compounds combined with selected sulfur-curable base rubbers.

6 Claims, 1 Drawing Sheet

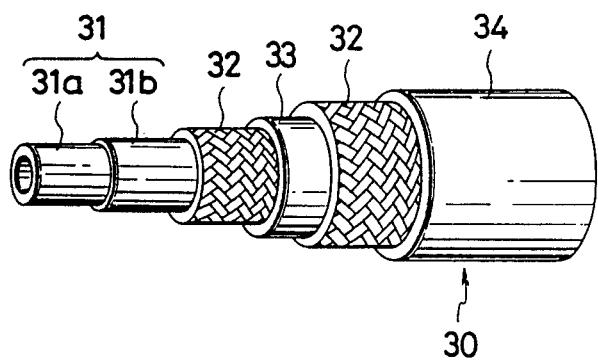

HOSE

This application is a continuation of application Ser. No. 137,615, filed Dec. 24, 1987, now abandoned.

BACKGROUND OF THE INVENTION

1. Field of the Invention

This invention relates to hoses having an inner tube, an outer cover and a reinforcement layer disposed therebetween, and more particularly to a power steering hose having enhanced heat-resisting properties.

2. Description of the Prior Art

Power steerings are a hydraulic power multiplier unit incorporated in steering mechanism of automotive vehicles. Hoses used in such unit are called "power steering hoses" and generally include an inner tube, a reinforcement layer of organic fibrous material such as nylon, and an outer cover laminated one on another.

The inner tubes of conventional power steering hoses are formed primarily of acrylonitrile butadiene copolymer rubber (NBR) which are prefereably for use in a temperature range of $-40°$ — $+120°$ C.

With an increasing tendency in the modern automobiles to be equipped with turbo-chargers and front-engine front-drive systems, there is a strong user's desire that power steering hoses be resistant to temperatures as high as $120°$-$160°$ C.

The conventional steering hoses having NBR inner tubes are however unsatisfactory in heat resisting properties and hence cannot withstand the desired high temperatures $120°$-$160°$ C.

With the foregoing difficulty in view, an attempt has been made to develop an inner tube formed by a polymer such as chlorosulfonated polyethylene rubber (SCM). The attempted development is however still short of the desired heat resistance.

According to another prior attempt, the inner tube of a power steering hose is composed of an inner layer formed of high-performance rubbers and an outer layer of conventional rubbers. A typical example of such double-layered inner tube has an inner layer formed of hydrogenated NBR and an outer layer of NBR. Hydrogenated NBR exhibits an improved resistance to heat and is known to be enhanced in its heat resistant properties by peroxide vulcanization.

Hydrogenated NBR, when used with NBR, however causes a problem that sulfur-vulcanized NBR fails to give sufficient adhesion to peroxide-vulcanized hydrogenated NBR while peroxide-vulcanized hydrogenated NBR is effective for adhesion to peroxide-vulcanized hydrogenated NBR, but not to reinforcement layers of organic fibrous materials. A further difficulty is that sulfur-vulcanized NBR and peroxide-vulcanized NBR when used concurrently often induce interfered reaction between sulfur and peroxide, failing to provide a stable adhesion or bondage therebetween and sometimes causing bulging or blister.

Other qualities are in many instances desired with respect to copper proofness, low-temperature flexibility, volumetric expansion, bursting strength and fitting mountability. However, they vary with the type of rubber compositions used. This problem precludes availability of a power steering hose capable of providing a good balance of all such qualities.

SUMMARY OF THE INVENTION

With the foregoing difficulties in view, it is the principal object of the present invention to provide an improved hose for use in vehicle power steering units which incorporate structural featues to meet with the foregoing requirements.

A more specific object of the present invention is to provide a power steering hose which excels in heat resistance.

According to the present invention, there is provided a power steering hose comprising:

(a) an inner tube;

(b) a reinforcement layer laminated peripherally on said inner tube; and (c) said inner tube having an inner layer and an outer layer, the inner layer being formed of at least one rubber composition, said rubber composition including a copolymer rubber comprising 10–45 weight percent of units of an unsaturated acrylonitrile, 0–5 weight percent of units of a conjugated diene, and 90–50 weight percent of units of an unsaturated ethylenic monomer other than an unsaturated acrylonitrile and/or units of a conjugated diene hydrogenate, and the outer layer being formed of a second rubber composition comprising a sulfur-vulcanizable starting rubber, a sulfur in an amount of 0.1–10 parts by weight based on 100 parts by weight of the starting rubber, an organic peroxide in an amount of 0.2–15 parts by weight based on 100 parts by weight of the starting rubber, and a 6-R-2,4-dimercapto-1,3,5-triazine compound in an amount of 0.2–15 parts by weight based on 100 parts by weigt of the starting rubber, the triazine compound being represented by the formula

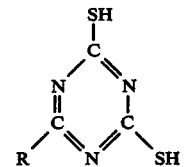

where R is a mercapto, alkoxy, mono- or di-alkylamino, mono- or di-cycloalkylamino, mono- or di-arylamino, or N-alkyl-N'-arylamino group.

Eligible materials for the reinforcement layer include organic fibrous materials and/or brass plated steel wires among which the organic fibers are particularly preferred for their high sound absorbing properties.

The foregoing and other objects and advantages of the present invention will be better understood from the following detailed description taken in connection with the accompanying drawing.

BRIEF DESCRIPTION OF THE DRAWING

The drawing is a perspective view of a hose embodying the present invention.

DESCRIPTION OF THE PREFERRED EMBODIMENT

Referring now to the drawing there is shown a power steering hose 30 according to the invention. The hose 30 includes an inner tube 31, two reinforcement layers 32, 32 of organic fibers and/or brass-plated steel wires, an insulation rubber layer 33 disposed between the reinforcement layers 32, and an outer cover 34 laminated peripherally over the insulation rubber layer 33. The inner tube 31 is composed of an inner layer 31a and an outer layer 31b. Eligible organic fibrous materials include nylon, polyester, rayon, cotton, vinylon, etc.

The inner layer 31a of the double-layered inner tube 31 is formed of a selected class of copolymer rubbers represented by the structure

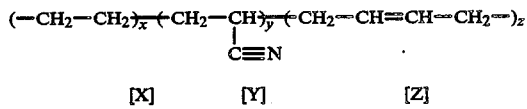

[X]     [Y]     [Z]

where [Y] is a repeating unit of an unsaturated acrylonitrile, [X] is a repeating unit of either or both of an unsaturated ethylenic monomer other than an unsaturated acrylonitrile and a conjugated diene hydrogenate, and [Z] is a repeating unit of a conjugated diene.

The amount of unit [Y] to be bonded should be in the range of 10-45 percent based on the weight of a given rubber. Smaller amounts would fail to give sufficient oil-resistance, and greater amounts would result in deteriorated low-temperature resistance.

The amount of unit [X] to be bonded should be in the range of 50-90 percent based on the weight of the rubber. Smaller amounts would result in reduced low-temperature resistance in the case of more unit [Y] and also reduced oil resistance in the case of more unit [Z]. Greater amounts, hence less unit [Y], would be ineffective for oil resistance.

The amount of unit [Z] to be bonded should be in the range of 0-5 percent based on the weight of the rubber. Greater amounts would invite reduced oil resistance.

Specific examples of the copolymer rubbers include hydrogenates of butadiene/acrylonitrile rubber, isoprene/acrylonitrile rubber and butadiene/isoprene/acrylonitrile rubber, butadiene/methyl acrylate/acrylonitrile rubber and butadiene/acrylic acid/acrylonitrile rubber and hydrogenates thereof, and butadiene/ethylene/acrylonitrile rubber, butyl acrylate/ethoxy ethyl acrylate/vinyl chloro acetate/acrylonitril rubber and butyl acrylate/ethoxy ethyl acrylate/vinyl norbornene/acrylonitrile rubber. These rubbers may be used alone or, where desired, in combination with other suitable rubbers.

There may be also used various additives such as fillers, reinforcing agents, vulcanizing agents, plasticizers, antioxidants and the like.

The following examples are given to further illustrate the invention. All formulation units are parts by weight unless otherwise noted.

Rubber Compositions A for Inner Layer of Inner Tube

Numerous rubber compositions A-1-A-13 were formulated as per Tables 1 and 2 prepared by mixing on an open mill at 601C for 15 minutes. All rubber compositions A-1-A-13 were tested for adhesion to fiber and to brass, and copper-proofness under the conditions given below and with the results tabulated.

(1) Rubber-to-Fiber Adhesion

Each composition A-1-A-13 was sheeted on a laboratory roll to a thickness of 2.5 mm. A test sample consisted of sheet of composition A-1-A-13 laminated with nylon fabric, both dimensioned to be 15 cm×10 cm×2.5 mm, and cellophane flap inserted in the seam of the laminate. Nylon fabric was derived by dipping square woven nylon-66 fabric at 20° C. for 5 minutes in a mixture of a resorcin-formalin condesate and a latex, followed by drying at 140° C. for 5 minutes and subsequent heat setting at 200° C. for 3 minutes. The laminate was press-cured at 153° C. and at 30 kgf/cm² for 90 minutes. The vulcanizate after being disposed at room temperature for 24 hours was cut to a width of 2.54 cm.

Peel strength was determined on the tensile tester at a pull speed of 50 mm/minute as stipulated in JIS K6301.

(2) Rubber-to-Brass Adhesion

Each composition A-1-A-13 was sheeted on a laboratory roll to a thickness of 2.5 mm. A test sample was made up of a sheet of composition A-1-A-13 laminated with brass plate, both dimensioned to be 15 cm×10 cm×2.5 mm, and cellophane flap inserted therebetween. The laminate was pressed-cured on a laboratory press at 153° C. and at 30 kgf/cm² for 90 minutes to give a vulcanizate which was then disposed at room temperature for 24 hours.

Peel strength was determined by the procedure of item (1) above.

In Tables 1 and 2, the adhesion qualities were assessed as follows:
(1) Rubber-to-Fiber Adhesion
  : Peel Strength more than 5 kgf/25 mm
  Δ: Peel Strength 3-5 kgf/25 mm
  x: Peel Strength less than 3 kgf/25 mm
(2) Rubber-to-Brass Adhesion
  : Peel Strength more than 10 kgf/25 mm
  Δ: Peel Strength 5-10 kgf/25 mm
  x: Peel Strength less than 5 kgf/25 mm As appears clear from Table 1, sulfur-vulcanized rubber compositions A-10 and A-11 are highly satisfactory in adhesion to both materials tested. the remainder showed insufficient adhesion to brass and nylon.

(3) Copper-Proofness

The rubber compositions A-1-A-13 were made into 2.2-2.5 mm thick sheets which were thereafter vulcanized with use of a laboratory press to obtain 2 mm thick rubber sheets. Specimens of 2 cm×4.5 cm×2 mm were applied on one surface with a coat containing 200-mesh copper powder and hydraulic oil (SAE No. 90SH) admixed in an equivalent weight ratio and subsequently oxidized at 150° C. in an oven. Flexural test was made with folding angle 180° and interval 24 hours. Length of time required for 1 mm or longer crack was measured. Coating was repeated every 24 hours.

The rubber compounds A-1-A-5, A-10 and A-11 are highly satisfactory in respect of resistance to copper ion degradation as exhibited by 5-6 days against copper. The use of one of Y, Z and X units beyond the above specified range resulted in inadequate copper-proofness, cracking only after 1-3 days, as evidenced by compounds A-6 through A-9.

The outer layer 31b is formed of a rubber composition which comprises specified amounts of a selected class of sulfurs, organic peroxides and triazine compounds combined with selected sulfur-curable base rubbers.

Starting rubbers eligible for the purpose of the invention are natural and synthetic rubbers capable of sulfur vulcanization. Typical examples include natural rubber (NR), polyisoprene rubber (IR), styrene-tutadiene copolymer rubber (SBR), polybutadiene rubber (BR), acrylonitrile-butadiene copolymer rubber (NBR), ethylene-propylene-diene terpolymer rubber (EPDM) and the like.

Sulfurs to be used herein include for example particulate sulfur, precipitated sulfur, colloidal sulfur, insoluble sulfur, highly dispersible sulfur, sulfur chloride and the like.

The amount of the sulfur to be added should be in the range of 0.1–10 weight parts, preferably 0.2–5 weight parts, based on 100 parts by weight of the starting rubber. Smaller amounts than 0.1 part would result in reduced modulus, and larger amounts than 10 parts would lead to interfered reaction with peroxide-vulcanized hydrogenated NBR rubber.

Eligible organic peroxides are such which allow crosslinking to occur to a moderate extent at curing temperature. To this end, dialkyl peroxides are preferred which have a half-life period of 10 hours and a decomposition temperature of higher than 80° C. Specific examples include dicumyl peroxide, 1,3-bis(t-butylpropoxy-isopropyl)-benzene, 4,4'-di-tert-butylperoxy valeric acid n-butyl and the like.

The amount of the organic peroxides to be added should be in the range of 0.2–15 weight parts as calculated in terms of the net content, preferably 0.5–5 weight parts, based on 100 parts by weight of the starting rubber. Smaller amounts than 0.2 part would fail to give sufficient adhesion to peroxide-vulcanized hydrogenated NBR rubber. Larger amounts than 15 parts would leave the peroxide unconsumed, making the vulcanizate less heat-resistant.

Triazine compounds useful in the invention are 6-R-2,4-dimercapto-1,3,5-triazines represented by the formula

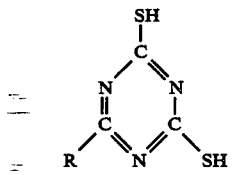

where R is a mercapto, alkoxy, mono- or di-alkylamino, mono- or di-cycloalkylamino, mono- or di-diarylamino, or N-alkyl-N'-arylamino group. 2,4,6-Trimercapto-1,3,5-triazine is particularly preferred.

The amount of the triazine compound to be added should be in the range of 0.2–15 weight parts, preferably 0.5–10 weight parts, based on 100 parts by weight of the starting rubber. Smaller amounts than 0.2 part would cause reduced modulus, hence deteriorated adhesion to brass and fiber. Larger amounts than 14 parts would produce no better results.

There may also be used various additives such as vulcanization accelerators, antioxidants, fillers, softeners, plasticizers, tackifiers, lubricants, peptizers, colorants, foaming agents, vulcanizing activators, dispersants, processing aids and the like.

The triazine compound according to the invention serves to act as an accelerator in sulfur vulcanization. To attain improved modulus of the vulcanizate, separate accelerators may suitably be added which include for example aldehyde-ammonias, aldehyde-amines, guanidines, thioureas, thiazoles, sulfenamides, thiurams, dithiocarbamates, xthantogenates and the like.

The rubber composition of the invention permits strong adhesion to peroxide-vulcanized hydrogenated NBR rubber and also to brass and to fiber. There is no particular restriction imposed on the kind of fibers which however may be selected from organic fibers such for example as polyhgexamethylene adipamide (nylon-66), polycaprolactum (nylon-6), polyvinyl alcohol, polyethylene terephthalate (polyester), rayon, aromatic polyamide, aromatic polyester and the like. Particularly preferred is such a fiber treated with a mixture of a resorcin-formalin condensate and a latex.

The double-layered inner tube 31 can be produced by any suitable conventional methods. The ratio of the thickness of inner layer 31a to the thickness of outer layer 31b can be selected at a described value in view of the characteristics of the hose 30 and the inside diameter of the inner tube. It is necessary however that the minimum thickness is 0.2 mm for the inner layer 31a and 0.1 mm for the outer layer 31b.

An inner layer having a thickness less than 0.2 mm would fail to give sufficient heat resistant and oil resistance. On the other hand, an outer layer havinng thickness less than 0.1 mm would result in insufficient adhesion to the inner layer of the inner tube and to the reinforcement layer.

The following examples are given to further illustrate the invention. All formation units are parts by weight unless otherwise noted.

Rubber Composition A for Inner Layer of Inner Tube and Rubber Composition d for Outer Layer of Inner Tube Hydrogenated NBR composition A-1 was formulated as per Table 1 and prepared by mixing on an open mill at 60° C. for 15 minutes. Different rubber compositions D-1 through D-17 were likewise prepared, the details as regards the formulations being shown in Tables 5–7.

All rubber compositions D-1–D-17 were tested for adhesion to nylon, brass and composition A-1 under the conditions given below and with the results tabulated.

(1) Rubber-to-Fiber Adhesion

The test was carried out in the same manner as done with respect to Composition A-1 through A-13 stated above.

(2) Rubber-to-Brass Adhesion

The test was carried out in the same manner as done with respect to Composition A-1 through A-13 stated above.

(3) Rubber-to-Rubber Adhesion

Composition A-1 and each of the compositions D-1–D-17, respectively, were sheeted on a laboratory roll to a thickness of 2.0 mm. A test sample was formed by laminating sheet of composition A-1 with sheet of composition D, both dimensioned to be 15 cm×10×2.0 mm. Disposed at one end of and in the seam of the laminate was cellophane as a flap for connection with a tensile tester. The laminate was press-cured on a laboratory press at 153° C. and at 30 kgf/cm² for 90 minutes. After being disposed at room temperature for 24 hours, the resulting vulcanizate was cut to a width of 2.54 cm. Peel strength was measured on the tensile tester at a pull speed of 50 mm/minute as stipulated in JIS K6301.

In Table 5–7, the adhesion qualities were assessed as follows:

(1) Rubber-to-Fiber Adhesion
○: Peel Strength more than 5 kgf/25 mm
△: Peel Strength 3–5 kgf/25 mm
x: Peel Strength less than 3 kgf/25 mm
(2) Rubber-to-Brass Adhesion
○: Peel Strength more than 10 kgf/25 mm
△: Peel Strength 5–10 kgf/25 mm
x: Peel Strength less than 5 kgf/25 mm (3) Rubber-to-Rubber Adhesion
◎: Peel Strength more than 10 kgf/25 mm
○: Peel Strength 8–10 kgf/25 mm
△: Peel Strength 5–8 kgf/25 mm
x: Peel Strength less than 5 kgf/25 mm The rubber composite D-1 vulcanized with sulfur alone was unacceptable in rubber-to-rubber adhesion as is apparent from Table 5. The peroxide-vulcanized rubber composition D-2 showed inadequate adhesion to brass and nylon. As appears clear from the same table, rubber compositions D-4, D-5, D-8 and D-9 are highly satisfactory in respect of adhesion to all the materials tested. Rubber compositions D-3, D-6 and D-7 devoid of triazine revealed poor adhesion to brass and to nylon.

Table 6 demonstrates that adhession to brass and nylon is deteriorated with a decrease of sulfur.

As appears clear from Table 7, peroxide added in smaller amount than the above specified range resulted in insufficient adhesion to rubber as evidenced by rubber composition D-14.

Inventive Examples 6–19 and Comparative Examples 10–16

Numerous sample hoses having an inside diameter of 9.5 mm and an outer diameter of 19.0 mm were prepared in accordance with a conventional procedure as shown in Tables 8–12. In this instance, rubber compositions D-1 through D-17 shown in Tables 5–7 were used to form an outer layer 31b of the double-layered inner tube 31 in combination of rubber compositions A-1, B-1 and C-1 used respectively for the formation of an inner layer 31a of the inner tube 31, an insulation rubber layer 33 and an outer cover 34.

All the hoses were examined for bursting strength, volumetric expansion, low-temperature flexibility, high-temperature impulse test and fitting mountability with the results tabulated. Performance tests were made in the same manner as done with respect to the hoses 20 of the first embodiment described above and hence will require no further description.

As appears clear from Table 8, the controls devoid of triazine, Comparative Examples 10–12, revealed early rupture in high-temperature impulse tests due to poor adhesion to nylon and brass, failing to give sufficient heat resistance. The use of sulfurs, organic peroxides and triazines in the above specified range showed sufficient heat resistance as evidenced by Inventive Examples 6 and 7.

Table 9 demonstrates the fact that heat resistance varies with the thickness ratio of the inner wall to the outer wall. Larger inner wall thickness leads to improved resistance to heat and stress cracking (Inventive Examples 7–10) but a small thickness less than 0.2 mm has been found insufficient for practical purposes (Comparative Example 13). The lower limits of the thickness of the inenr and outer layers have been confirmed to be critical with respect to heat resistance as is apparent from Inventive Examples 8 and 10.

The controls devoid of or having insufficient amount of triazine, Comparative Examples 14 and 15, failed to give sufficient sufficient heat resistance and fitting mountability as shown in Table 10. Sufficient amount of triazine, Inventive Examples 11 and 12, produced results contrastive to Comparative Examples 14 and 15.

As appears clear from Table 11, heat resistance and stress cracking are improved with an increase in amount of sulfur.

Table 12 demonstrates the fact that an insufficient amount of ganic peroxide results in insufficient heat resistance and fitting mountability as evidenced by Comparative Composition D-16. The larger the amount of organic peroxide, the greater heat resistance as evidenced by Inventive Compositions 17–19.

Having thus described the invention, it will be apparent to those skilled in the art that various changes and modifications may be made to the invention without departing from the scope of the appended claims.

TABLE 1

[Formulations/Properties of Inner Layers of Inner Tubes]

| Formulations/Properties | | A-1 | A-2 | A-3 | A-4 | A-5 | A-6 | A-7 | A-8 | A-9 | A-10 | A-11 |
|---|---|---|---|---|---|---|---|---|---|---|---|---|
| Polymer Composition | | | | | | | | | | | | |
| Y unit (VCN)(wt. %) | | 33 | 34 | 38 | 33 | 43 | 33 | 43 | 50 | 50 | 33 | 33 |
| Z unit (C=C)(wt. %) | | 1.3 | 1.3 | 1.2 | 3.3 | 2.9 | 6.7 | 6.7 | 2.9 | 6.7 | 1.3 | 3.3 |
| X unit (C—C)(wt. %) | | 65.7 | 64.7 | 60.8 | 63.7 | 54.1 | 60.3 | 50.3 | 47.1 | 43.3 | 65.7 | 63.7 |
| Formulations | | | | | | | | | | | | |
| Polymer | | 100 | 100 | 100 | 100 | 100 | 100 | 100 | 100 | 100 | 100 | 100 |
| SRF | (1) | 95 | 95 | 95 | 95 | 95 | 95 | 95 | 95 | 95 | 95 | 95 |
| MgO | | 10 | 10 | 10 | 10 | 10 | 10 | 10 | 10 | 10 | | |
| ZnO | | 2 | 2 | 2 | 2 | 2 | 2 | 2 | 2 | 2 | 5 | 5 |
| Stearic acid | | 1 | 1 | 1 | 1 | 1 | 1 | 1 | 1 | 1 | 1 | 1 |
| Vulkanox DDA | (2) | 1.5 | 1.5 | 1.5 | 1.5 | 1.5 | 1.5 | 1.5 | 1.5 | 1.5 | | |
| Vulkanox ZMB-2 | (3) | 1.5 | 1.5 | 1.5 | 1.5 | 1.5 | 1.5 | 1.5 | 1.5 | 1.5 | | |
| antioxidant RD-G | (4) | | | | | | | | | | 2 | 2 |
| WAX | (5) | 1 | 1 | 1 | 1 | 1 | 1 | 1 | 1 | 1 | | |
| TAIC | (6) | 2 | 2 | 2 | 2 | 2 | 2 | 2 | 2 | 2 | | |
| Witamol 218 | (7) | 7 | 7 | 7 | 7 | 7 | 7 | 7 | 7 | 7 | | |
| DOP | (8) | | | | | | | | | | 5 | 5 |
| Perkadox 14/40 | (9) | 7.5 | 7.5 | 7.5 | 7.5 | 7.5 | 7.5 | 7.5 | 7.5 | 7.5 | | |
| sulfur | | | | | | | | | | | 1.5 | 1.5 |
| accelerator CZ | (10) | | | | | | | | | | 1.5 | 1.5 |
| Retarder PVI | (11) | | | | | | | | | | 1 | 1 |
| Adhesion to nylon fabric | | △ | △ | △ | △ | △ | △ | △ | △ | △ | ○ | ○ |
| Adhesion to brass plate | | x | x | x | x | x | x | x | x | x | ○ | ○ |
| Copper-Proofness at 150° C. | | | | | | | | | | | | |
| length of time required | | 6 | 6 | 6 | 5 | 5 | 1 | 1 | 3 | 1 | 5 | 5 |

TABLE 1-continued

[Formulations/Properties of Inner Layers of Inner Tubes]

| Formulations/Properties | A-1 | A-2 | A-3 | A-4 | A-5 | A-6 | A-7 | A-8 | A-9 | A-10 | A-11 |
|---|---|---|---|---|---|---|---|---|---|---|---|
| for cracking (day) | | | | | | | | | | | |

(1) Asahi No. 50, Asahi Carbon Co.
(2) diphenylamine derivatives, Bayer AG
(3) 4,5-methylmercapto-benzimidazole zinc salt, Bayer AG
(4) Antigen RD-G, Sumitomo Kagaku Kogyo Co.
(5) RE 520, Hoechst AG
(6) triallylisocyanate, Nippon Chemical Co.
(7) trimellitic acid ester, Dynamit Nobel AG
(8) plasticizer, Chisso Petrochemical Co.
(9) 1,3-bis-(t-butylperoxy-isopropyl)-benzene, peroxide content 40 wt %, Kakayu Noury Corp.
(10) Sunceller CZ, Sanshin Chemical Industries
(11) Monsanto Chemical Co.

TABLE 2

[Formulations/Properties of Inner Layer of Inner Tubes]

| | | A-12 | A-13 |
|---|---|---|---|
| Nipol 1042 | (12) | 100 | |
| Hypalon 40 | (13) | | 100 |
| SRF | (1) | 90 | 80 |
| ZnO | | 5 | |
| Ac Polyethylene | | | 3 |
| stearic acid | | 1 | |
| MgO | | | 5 |
| antioxidant OD | (14) | 1 | |
| antioxidant NBC | (15) | | 1 |
| DOP | (8) | 10 | 10 |
| sulfur | | 2 | |
| Litherge | (16) | | 5 |
| accelerator TS | (17) | 1 | |
| accelerator TRA | (18) | | 1.5 |
| Adhesion to nylon fabric | | o | o |
| Adhesion to brass plate | | o | o |
| Copper-Proofness at 150° C. length of time required for cracking (day) | | 1 | 1 |

(1), (9) - same as in Table 1
(12) NBR, Nippon Zeon Co.
(13) CSM, E. I. DuPont de Nemours & Co.
(14) Antage OD, Kawaguchi Chemical Co.
(15) Nocrac NBC, Ohuchi Shinko Chemical Co.
(16) lithyarge yellow No. 1,
(17) Sunceller MSPO, Sanshin Chemical Industries Co.
(18) Sunceller TRA, Sanshin Chemical Industries Co.

TABLE 3

[Formulations of Insulation Rubber Layer]

| | | -1 |
|---|---|---|
| Nipol 1042 | (12) | 100 |
| SRF | (1) | 60 |
| silicate | | 20 |
| ZnO | | 5 |
| stearic acid | | 1 |
| Resorcinol | (19) | 3 |
| ZISNET F | (20) | 2 |
| DOP | (8) | 20 |
| sulfur | | 2 |
| accelerator CM | (21) | 1 |
| hexamethylene tetramine | (22) | 2 |

(1), (8) and (12) - same as in Tables 1 and 2
(19) Suitomo Kagaku Kogyo Co.
(20) 2,4,6-trimercapto-1,3,5-triazine, Sankyo Chemical Co.
(21) Sunceller CM-PO, Sanshin Chemical Industries Co.
(22) Nocceller H, Ohuchi Shinko Chemical Co.

TABLE 4

[Formulations of Outer Cover]

| | | C-1 | C-2 |
|---|---|---|---|
| Hypalon 40 | (13) | 100 | |
| Neoprone W | (23) | | 100 |
| SRF | (1) | 80 | 60 |
| Polyethylene | | 3 | |
| stearic acid | | | 1 |
| MgO | | | 4 |
| antioxidant N\|C | (15) | 1 | |
| antioxidant OD | (14) | 1 | 2 |
| DOP | (8) | 9 | |
| softner 1150N | (24) | | 10 |
| Litherge | (16) | 5 | |
| ZnO | | | 5 |
| accelerator TRA | (18) | 1.5 | |
| accelerator ETU | (25) | | 0.75 |

(1), (8) - same as in Table 1
(14)–(18) - same as in Table 2
(23) CR, Showa Neoprene Co.
(24) Fuccol 1150N, Fuji Kosan Co.
(25) Sunceller 22, Sanshin Chemical Industries Co.

TABLE 5

[Formulations/Properties of Outer Layers of Inner Tubes]
Varied Amount of Triazine

| | | D-1 | D-2 | D-3 | D-4 | D-5 | D-6 | D-7 | D-8 | D-9 |
|---|---|---|---|---|---|---|---|---|---|---|
| Nipol 1042 | (12) | 100 | 100 | 100 | 100 | 100 | 100 | 100 | 100 | 100 |
| SRF | (1) | 80 | 80 | 80 | 80 | 80 | 80 | 80 | 80 | 80 |
| ZnO | | 5 | 5 | 5 | 5 | 5 | 5 | 5 | 5 | 5 |
| antioxidant OD | (14) | 2 | 2 | 2 | 2 | 2 | 2 | 2 | 2 | 2 |
| sulfur | | 2 | | 1 | 1 | 1 | 1 | 1 | 1 | 1 |
| accelerator TS | (17) | 1 | | | | 1 | | | | |
| Perkadox 14/40 | (9) | | 7.5 | 5 | 5 | 5 | 5 | 5 | 5 | 5 |
| ZISNET F | (20) | | | | 1 | 1 | | 0.1 | 1 | 2 |
| Adhesion to nylon fabric | | O | x | x | O | O | x | x | O | O |
| Adhesion to brass plate | | O | x | x | O | O | x | x | O | O |
| Adhesion to Rubber | | | | | | | | | | |

TABLE 5-continued

[Formulations/Properties of Outer Layers of Inner Tubes]
Varied Amount of Triazine

|  | D-1 | D-2 | D-3 | D-4 | D-5 | D-6 | D-7 | D-8 | D-9 |
|---|---|---|---|---|---|---|---|---|---|
| composition A-1 | x | ○ | ○ | ◎ | ◎ | ◎ | ◎ | ◎ | ◎ |

(1), (9) - same as in Table 1
(12), (14) and (17) - same as in Table 2
(20), - same as in Table 3

TABLE 6

[Formulations/Properties of Outer Layers of Inner Tubes]
Varied Amount of Sulfur

|  |  | D-10 | D-11 | D-12 | D-13 |
|---|---|---|---|---|---|
| Nipol 1042 | (12) | 100 | 100 | 100 | 100 |
| SRF | (1) | 80 | 80 | 80 | 80 |
| ZnO |  | 5 | 5 | 5 | 5 |
| antioxidant OD | (14) | 2 | 2 | 2 | 2 |
| sulfur |  | 0.1 | 0.5 | 1.0 | 1.5 |
| accelerator TS | (17) | 1 | 1 | 1 | 1 |
| Perkadox 14/40 | (9) | 5 | 5 | 5 | 5 |
| ZISNET F | (20) | 1 | 1 | 1 | 1 |
| Adhesion to nylon fabric |  | Δ | o | o | o |
| Adhesion to brass plate |  | Δ | o | o | o |
| Adheion to Rubber composition A-1 |  | x | o | o | o |

(1), (9) - same as in Table 1
(12), (14) and (17) - same as in Table 2
(20) - same as in Table 3

TABLE 7

[Formulations/Properties of Outer Layers of Inner Tubes]
Varied Amount of Peroxide

|  |  | D-14 | D-15 | D-16 | D-17 |
|---|---|---|---|---|---|
| Nipol 1042 | (12) | 100 | 100 | 100 | 100 |
| SRF | (1) | 80 | 80 | 80 | 80 |
| ZnO |  | 5 | 5 | 5 | 5 |
| antioxidant OD | (14) | 2 | 2 | 2 | 2 |
| sulfur |  | 1 | 1 | 1 | 1 |
| accelerator TS | (17) | 1 | 1 | 1 | 1 |
| Perkadox 14/40 | (9) | 0.25 | 2.5 | 5 | 7.5 |
| ZISNET F | (20) | 1 | 1 | 1 | 1 |
| Adhesion to nylon fabric |  | o | o | o | o |
| Adhesion to brass plate |  | o | o | o | o |
| Adhesion to Rubber composition A-1 |  | x | o | o | o |

(1), (9) - same as in Table 1
(12), (14) and (17) - same as in Table 2
(20) - same as in Table 3

TABLE 8

Improvement in Fitting Mountability

|  |  | Inventive Example 1 | Comparative Example 10 | Comparative Example 11 | Comparative Example 12 | Inventive Example 6 | Inventive Example 7 |
|---|---|---|---|---|---|---|---|
| Inner Tube | Rubber Composition |  |  |  |  |  |  |
|  | inner layer | A-1 | A-1 | A-1 | A-1 | A-1 | A-1 |
|  | outer layer | — | — | — | — | — | — |
|  | Thickness |  |  |  |  |  |  |
|  | inner layer | 1.6 | 0.8 | 0.8 | 0.8 | 0.8 | 0.8 |
|  | outer layer | — | 0.8 | 0.8 | 0.8 | 0.8 | 0.8 |
|  | Thickness ratio | 1 | 0.5 | 0.5 | 0.5 | 0.5 | 0.5 |
| Reinforcement layer |  | 6-6 Nylon | 6-6 Nylon | 6-6 Nylon | 6-6 Nylon | 6-6 Nylon | 6-6 Nylon |
| Insulation rubber layer |  | B-1 | B-1 | B-1 | B-1 | B-1 | B-1 |
| Outer Cover |  | C-1 | C-1 | C-1 | C-1 | C-1 | C-1 |
| Vulcanization Condition |  | 160° C. × 90' | 160° C. × 90' | 160° C. × 90' | 160° C. × 90' | 160° C. × 90' | 160° C. × 90' |
| Bursting Pressure (kgf/cm$^2$) |  | 600–620 | 580–620 | 600–620 | 600–630 | 580–620 | 600–630 |
| Volumetric Expansion (cc/ft at 91 kgf/cm$^2$) |  | 6–8 | 6–7 | 6–8 | 6–8 | 6–8 | 6–7 |
| Low Temperature Flexibility (−40° C.) |  | failure unfound | failure unfound | failure unfound | failure unfound | failure unfound | failure unfound |
| Impulse Test (SAEJ188 Type 1: 140° C. million times) 160° C. |  | 300–350 100–120 | 1–10 inassessable | 60–120 10–30 | 80–150 5–50 | 280–300 80–100 | 300 100 |
| Fitting Mountability |  | o | x | Δ | Δ | o | o |

TABLE 9

Varied Thickness Ratio of Inner and Outer Layers

|  |  | Comparative Example 13 | Inventive Example 8 | Inventive Example 7 | Inventive Example 9 | Inventive Example 10 |
|---|---|---|---|---|---|---|
| Inner Tube | Rubber Composition |  |  |  |  |  |
|  | inner layer | A-1 | A-1 | A-1 | A-1 | A-1 |
|  | outer layer | D-1 | D-1 | D-1 | D-1 | D-1 |
|  | Thickness |  |  |  |  |  |
|  | inner layer | 0.1 | 0.2 | 0.8 | 1.4 | 1.5 |
|  | outer layer | 1.5 | 1.4 | 0.8 | 0.2 | 0.1 |
|  | Thickness ratio | 0.06 | 0.12 | 0.50 | 0.88 | 0.94 |
| Reinforcement layer |  | 6-6 Nylon | 6-6 Nylon | 6-6 Nylon | 6-6 Nylon | 6-6 Nylon |
| Insulation rubber layer |  | B-1 | B-1 | B-1 | B-1 | B-1 |
| Outer Cover |  | C-1 | C-1 | C-1 | C-1 | C-1 |
| Vulcanization Condition |  | 160° C. × 90' | 160° C. × 90' | 160° C. × 90' | 160° C. × 90' | 160° C. × 90' |
| Bursting Pressure (kgf/cm$^2$) |  | 600–620 | 580–620 | 600–630 | 600–620 | 580–620 |
| Volumetric Expansion |  | 6–7 | 6–8 | 6–7 | 6–8 | 6–8 |

TABLE 9-continued

| | | Varied Thickness Ratio of Inner and Outer Layers | | | | |
|---|---|---|---|---|---|---|
| | | Comparative | Inventive Example | | | |
| | | Example 13 | 8 | 7 | 9 | 10 |
| (cc/ft at 91 kgf/cm$^2$) | | | | | | |
| Low Temperature Flexibility (−40° C.) | | failure unfound | failure unfound | failure unfound | failure unfound | failure unfound |
| Impulse Test (SAEJ188 Type 1: million times) | 140° C. | 150–200 | 280–300 | 300 | 280–320 | 250–280 |
| | 160° C. | 40–60 | 90–100 | 100 | 100–110 | 70–90 |
| Fitting Mountability | | o | o | o | o | o |

TABLE 10

| | | Varied Amount of Triazine | | | |
|---|---|---|---|---|---|
| | | Comparative Example | | Inventive Example | |
| | | 14 | 15 | 11 | 12 |
| Inner Tube | Rubber Composition | | | | |
| | inner layer | A-1 | A-1 | A-1 | A-1 |
| | outer layer | D-6 | D-7 | D-8 | D-9 |
| | Thickness | | | | |
| | inner layer | 0.8 | 0.8 | 0.8 | 0.8 |
| | outer layer | 0.8 | 0.8 | 0.8 | 0.8 |
| | Thickness ratio | 0.5 | 0.5 | 0.5 | 0.5 |
| Reinforcement layer | | 6-6 Nylon | 6-6 Nylon | 6-6 Nylon | 6-6 Nylon |
| Insulation rubber layer | | B-1 | B-1 | B-1 | B-1 |
| Outer Cover | | C-1 | C-1 | C-1 | C-1 |
| Vulcanization Condition | | 160° C. × 90' | 160° C. × 90' | 160° C. × 90' | 160° C. × 90' |
| Bursting Pressure (kgf/cm$^2$) | | 600–630 | 590–620 | 580–620 | 600–620 |
| Volumetric Expansion (cc/ft at 91 kgf/cm$^2$) | | 6–8 | 6–7 | 6–8 | 6–8 |
| Low Temperature Flexibility (−40° C.) | | failure unfound | failure unfound | failure unfound | failure unfound |
| Impulse Test (SAEJ188 Type 1: million times) | 140° C. | 80–150 | 150–220 | 280–300 | 280–300 |
| | 160° C. | 5–50 | 20–50 | 80–100 | 80–110 |
| Fitting Mountability | | x | x | o | o |

TABLE 11

| | | Varied Amount of Sulfur | | | |
|---|---|---|---|---|---|
| | | Inventive Example | | | |
| | | 13 | 14 | 15 | 16 |
| Inner Tube | Rubber Composition | | | | |
| | inner layer | A-1 | A-1 | A-1 | A-1 |
| | outer layer | D-10 | D-11 | D-12 | D-13 |
| | Thickness | | | | |
| | inner layer | 0.8 | 0.8 | 0.8 | 0.8 |
| | outer layer | 0.8 | 0.8 | 0.8 | 0.8 |
| | Thickness ratio | 0.5 | 0.5 | 0.5 | 0.5 |
| Reinforcement layer | | 6-6 Nylon | 6-6 Nylon | 6-6 Nylon | 6-6 Nylon |
| Insulation rubber layer | | B-1 | B-1 | B-1 | B-1 |
| Outer Cover | | C-1 | C-1 | C-1 | C-1 |
| Vulcanization Condition | | 160° C. × 90' | 160° C. × 90' | 160° C. × 90' | 160° C. × 90' |
| Bursting Pressure (kgf/cm$^2$) | | 600–620 | 600–620 | 600–630 | 600–620 |
| Volumetric Expansion (cc/ft at 91 kgf/cm$^2$) | | 6–8 | 6–8 | 6–7 | 6–7 |
| Low Temperature Flexibility (−40° C.) | | failure unfound | failure unfound | failure unfound | failure unfound |
| Impulse Test (SAEJ188 Type 1: million times) | 140° C. | 270–300 | 270–300 | 300 | 280–310 |
| | 160° C. | 80–100 | 80–100 | 100 | 100–110 |
| Fitting Mountability | | o | o | o | o |

TABLE 12

| | | Varied Amount of Peroxide | | | |
|---|---|---|---|---|---|
| | | Comparative Example 16 | Inventive Example | | |
| | | | 17 | 18 | 19 |
| Inner Tube | Rubber Composition | | | | |
| | inner layer | A-1 | A-1 | A-1 | A-1 |
| | outer layer | D-14 | D-15 | D-16 | D-17 |
| | Thickness | | | | |

TABLE 12-continued

| | | Varied Amount of Peroxide | | | |
|---|---|---|---|---|---|
| | | Comparative Example 16 | Inventive Example 17 | 18 | 19 |
| inner layer | | 0.8 | 0.8 | 0.8 | 0.8 |
| outer layer | | 0.8 | 0.8 | 0.8 | 0.8 |
| Thickness ratio | | 0.5 | 0.5 | 0.5 | 0.5 |
| Reinforcement layer | | 6-6 Nylon | 6-6 Nylon | 6-6 Nylon | 6-6 Nylon |
| Insulation rubber layer | | B-1 | B-1 | B-1 | B-1 |
| Outer Cover | | C-1 | C-1 | C-1 | C-1 |
| Vulcanization Condition | | 160° C. × 90' | 160° C. × 90' | 160° C. × 90' | 160° C. × 90' |
| Bursting Pressure (kgf/cm²) | | 600–630 | 580–620 | 600–630 | 580–620 |
| Volumetric Expansion (cc/ft at 91 kgf/cm²) | | 6–8 | 6–8 | 6–7 | 6–8 |
| Low Temperature Flexibility (−40° C.) | | failure unfound | failure unfound | failure unfound | failure unfound |
| Impulse Test (SAEJ188 Type 1: million times) | 140° C. | 80–100 | 220–250 | 300 | 300 |
| | 160° C. | 10–30 | 80–90 | 100 | 90–100 |
| Fitting Mountability | | Δ | ○ | ○ | ○ |

What is claimed is:

1. A hose comprising:
   (a) an inner tube having an inner layer and an outer layer; and
   (b) a reinforcement layer laminated peripherally on said inner tube;
   (c) said inner layer being formed of at least one rubber composition, said rubber composition including a copolymer rubber comprising 10–45 weight percent of units of an unsaturated acrylonitrile, 0–5 weight percent of units of a conjugated diene, and 90–50 weight percent of units of an unsaturated ethylenic monomer other than an unsaturated acrylonitrile and/or units of a conjugated diene hydrogenate; and
   (d) said outer layer being formed of a second rubber composition comprising:
   a sulfur-vulcanizable starting rubber,
   sulfur in an amount of 0.1–10 parts by weight based on 100 parts by weight of said starting rubber,
   an organic peroxide in an amount of 0.2–15 parts by weight based on 100 parts by weight of said starting rubber, and
   a 6-R-2,4-dimercapto-1,3,5-triazine compound in an amount of 0.2–15 parts by weight based on 100 parts by weight of said starting rubber, said triazine compound being represented by the formula

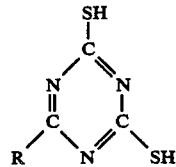

where
R is a mercapto, alkoxy, mono- or di-alkylamino, mono- or di-cycloalkylamino, mono- or di-arylamino, or N-alkyl-N'-arylamino group.

2. A hose according to claim 1, further including an outer cover laminated peripherally on said reinforcement.

3. A hose according to claim 1, said rubber being selected from the group consisting of hydrogenates of butadiene/acrylonitrile rubber, isoprene/acrylonitrile rubber and butadiene/isoprene/acrylonitrile rubber, butadiene/methylacrylate/acrylonitrile rubber and butadiene/acrylic acid/acrylonitrile rubber and hydrogenates thereof, and butadiene/ethylene/acrylonitrile rubber, butyl acrylate/ethoxy ethyl acrylate/vinyl chloro acetate/acrylonitrile rubber and butyl acrylate/ethoxy ethyl acetate/vinyl norbornene/acrylonitrile rubber.

4. A hose according to claim 1, said starting rubber being selected from the group consisting of natural rubber, polyisoprene rubber, styrene-butadiene copolymer rubber, acrylonitrile-butadiene copolymer rubber or ethylene-propylene-diene terpolymer rubber.

5. A hose according to claim 1, said rubber composition of said inner layer being vulcanized with an organic peroxide.

6. A hose according to claim 1, said inner layer having a thickness not less than 0.2 mm, said outer layer having a thickness not less than 0.1 mm.

* * * * *